US007024952B2

(12) United States Patent
Huynh et al.

(10) Patent No.: US 7,024,952 B2
(45) Date of Patent: Apr. 11, 2006

(54) AUTOMATED METHOD AND SYSTEM TO ASSEMBLE AND INSPECT TUBING ASSEMBLIES

(75) Inventors: Dan N. Huynh, Irvine, CA (US); David K. Vogt, Pomona, CA (US); Stephen J. Morgan, Cypress, CA (US); Christopher C. Calkin, Huntington Beach, CA (US); Kyle G. Dalton, Long Beach, CA (US); Michael L. Jones, Stanton, CA (US); William S. Carnegie, Rossmoor, CA (US); Yong C. Joo, Buena Park, CA (US)

(73) Assignee: The Boeing Company, Chicago, IL (US)

( * ) Notice: Subject to any disclaimer, the term of this patent is extended or adjusted under 35 U.S.C. 154(b) by 191 days.

(21) Appl. No.: 10/684,983

(22) Filed: Oct. 14, 2003

(65) Prior Publication Data

US 2005/0076723 A1 Apr. 14, 2005

(51) Int. Cl.
*G01M 19/00* (2006.01)

(52) U.S. Cl. ..................................................... 73/865.8

(58) Field of Classification Search ................ 73/865.5
See application file for complete search history.

(56) References Cited

U.S. PATENT DOCUMENTS

| | | | | |
|---|---|---|---|---|
| 3,688,534 | A | 9/1972 | Anderson | |
| 3,766,054 | A * | 10/1973 | Ensinger | 208/89 |
| 4,593,476 | A | 6/1986 | Clark et al. | |
| 5,941,366 | A * | 8/1999 | Quinlan et al. | 198/465.1 |
| 6,343,690 | B1 * | 2/2002 | Britton et al. | 198/867.06 |

* cited by examiner

*Primary Examiner*—Hezron Williams
*Assistant Examiner*—Paul M. West
(74) *Attorney, Agent, or Firm*—Thompson Coburn LLP

(57) ABSTRACT

An automated method and system to assemble and inspect tubing assemblies includes one or more coordinate tables with each table having a plurality of robotic fixtures mounted for movement on the table. The robotic fixtures are controlled by a computerized control system to move to predetermined positions on the table surface, and tubing holders on the robotic fixtures are controlled to receive portions of a bent length of metal tubing to inspect and assemble the portions of tubing.

25 Claims, 5 Drawing Sheets

AUTOMATED METHOD AND SYSTEM TO ASSEMBLE AND INSPECT TUBING ASSEMBLIES

BACKGROUND OF THE INVENTION (1) Field of the Invention

The present invention pertains to an apparatus and a method of controlling the apparatus to assemble and inspect formed tubing assemblies. More specifically, the present invention pertains to a coordinate table and a plurality of robotic fixtures mounted for movement on the table. The robotic fixtures are controlled to move to predetermined positions on the table and tubing holders on the robotic fixtures are controlled to receive portions of a bent length of metal tubing to inspect and assemble the portions of the tubing.

(2) Description of the Related Art

Formed or bent lengths of metal tubing are used in a variety of manufactured products for conveying fluids such as hydraulic fluid and pressurized air. Formed metal tubing is used in the manufacture of aircraft, ships, and land vehicles, to name only a few examples.

In manufacturing procedures involving formed metal tubing, it is often necessary to first inspect the tubing to insure that bends formed in the tubing length have been bent at the correct angles, and to ensure that portions of the tubing length have the correct dimensions. The inspections are performed on the tubing to ensure that the tubing will fit properly in its intended position in the manufactured product.

It is currently very time-consuming and expensive to assemble and inspect hydraulic, air and other tubing used in the manufacture of products such as aircraft, ships, and land vehicles. Tubing is typically assembled for welding and inspection using manual methods that employ either dedicated holding fixtures or adjustable holding fixtures. Adjustment data for the adjustable holding fixtures is provided by dedicated drawings for the particular tubing part, or by digital data for the particular tubing part that is recorded in a coordinate measurement machine.

In the use of dedicated fixtures in the assembly and inspection of tubing, a set of fixtures is specifically designed for each particular tubing part. A part number of the tubing part identifies which set of fixtures is used to assemble and inspect the tubing part. The tubing part number is used to retrieve the specific set of fixtures from a storage facility where the dedicated fixtures are kept. The set of fixtures are manually retrieved from the storage facility and then are manually assembled relative to each other. The particular tubing part is then mounted on the assembled fixtures for inspection of the part. In the inspection of the tubing part the bent angles of the part and the dimensions of portions of the part are checked by mounting the part on the dedicated fixtures.

The assembly and inspection of tubing using dedicated fixtures requires a considerable amount of time to assemble the set of fixtures. For a manufacturing facility that makes use of a number of different tubing parts, a set of fixtures is specifically designed for each tubing part and these sets of fixtures are kept in inventory until needed. This results in thousands of sets of fixtures being stored in inventory. These thousands of sets of fixtures must also be periodically inspected to ensure that the use of the fixtures over time has not altered the configurations and dimensions of the fixtures. Thus, the maintenance of the dedicated fixtures is also very time-consuming and costly.

The use of adjustable fixtures with dedicated drawings requires that a set of adjustable fixtures be manually retrieved from inventory and manually adjusted for each tubing part to be assembled and inspected. The adjusted fixtures are manually positioned on a mylar drawing at specific positions on the drawing for the particular tubing part to be assembled and inspected. This procedure requires the storage and maintenance of a large number of adjustable fixtures and dedicated drawings, each corresponding to a particular tubing part. The drawings, as well as the adjustable fixtures, are manually retrieved from storage when needed. This procedure is also very time-consuming and costly.

The use of adjustable fixtures with a coordinate measurement machine eliminates the need for storing thousands of drawings for the tubing parts, but still requires manual adjustment and positioning of the adjustable fixtures for the assembly and inspection of the tubing parts. This procedure is also time-consuming and costly.

SUMMARY OF THE INVENTION

The present invention provides an automated system and method to assemble and inspect tubing assemblies and eliminates the need for storing thousands of dedicated fixtures, eliminates the need for storing thousands of tubing assembly drawings and adjustment data, eliminates the need to retrieve digital data for tubing assemblies from a coordinate measurement machine, and eliminates the need to manually adjust adjustable fixtures for each tubing assembly. The system of the invention combines the assembly and inspection of tubing assemblies in one process, and provides electronic data entry and documentation for the tubing assembled and inspected by the system.

The tubing assembly and inspection system of the invention is comprised of a multiple of small-scale robotic fixtures mounted for movement on a table surface. The fixtures are capable of moving in mutually perpendicular X and Y coordinate directions on the planar table surface using linear servomotor technology. Each of the robotic fixtures, in addition to being able to move over the table surface in the X and Y plane, also has the ability to rotate around a vertical Z axis that is perpendicular to the table surface.

End effectors or tubing holders are mounted at the tops of the robotic fixtures. A plurality of actuators on each robotic fixture articulates the fixture's tubing holder in multiple degrees of freedom.

A control system controls the movement of the robotic fixtures on the table surface. The robotic fixtures are controlled to move to a variety of different positions on the table surface, forming infinite combinations of positions of the fixtures and their tubing holders to support any tubing configuration.

The control system is computerized and has a database that stores data on all of the tubing configurations to be assembled and inspected. In use, an operator inputs part number information into the control system using a keyboard or a barcode reader and then initiates the operation of the system. The robotic fixtures then simultaneously position themselves at predetermined X and Y coordinate locations on the table surface, rotate about the Z axis of each fixture, and operate their actuators to move their tubing holders to programmed positions to accept the tubing. The system operator then positions the length of tubing to be assembled and inspected on the tubing holders of the fixtures. The operator verifies the position and fit of the tubing, and the coordinates of all of the robotic fixtures are then printed out as a means of inspection.

The system is also designed to be modular. Multiple tables, each with a multiple of robotic fixtures can be added to the system and interconnected as the number of parts increase or the size of the tubing to be assembled and inspected increases.

Compared with all other existing tubing assembly and inspection methods, the automated assembly and inspection system of the invention is preferred in that it completely automates the assembly and inspection process. It eliminates operator errors and can provide potential tubing bend error feedback to tubing bending machines. It eliminates the current time-consuming manual fixture retrieval, adjustment, drawing retrieval and all logistical problems involved. In addition, the system of the invention also applies to tubing assembly and inspection operations of various different industries.

BRIEF DESCRIPTION OF THE DRAWINGS

Further features of the invention are set forth in the following detailed description of the preferred embodiment of the invention and in the drawing figures wherein.

DETAILED DESCRIPTION OF THE PREFERRED EMBODIMENT

Figure 1:
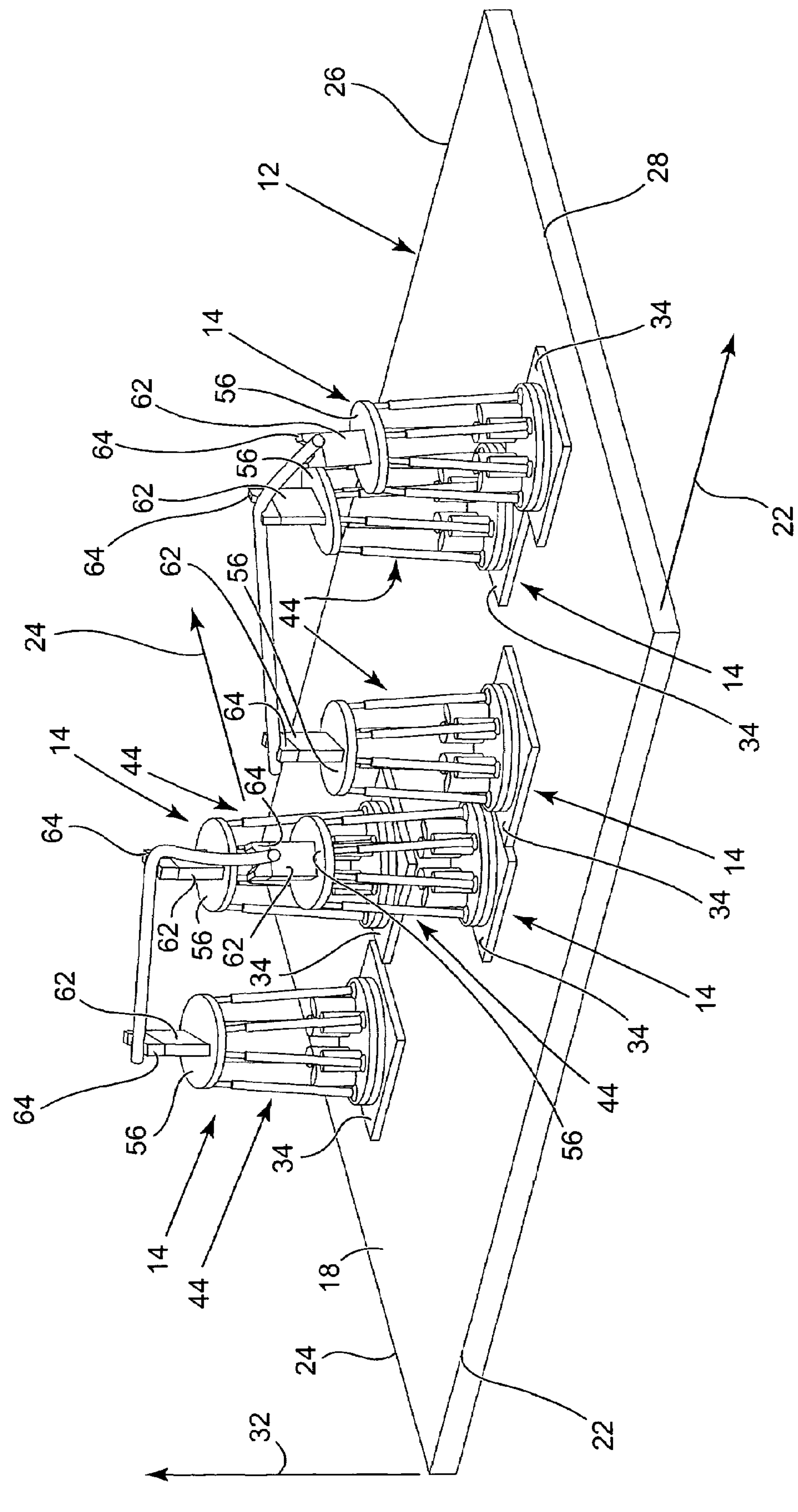
FIG. 1 is a schematic representation of the automated system for assembling and inspecting tubing assemblies that is the subject of the invention.

The automated system to assemble and inspect tubing assemblies is basically comprised of a table 12, a plurality of small-scale robotic fixtures 14 that move over the table, and a control system 16 that controls the movements of the robotic fixtures. The particular constructions of each of the component parts of the invention can take many forms, and therefore they are represented schematically in the drawing figures.

The table 12 is basically constructed to support the multiple robotic fixtures 14 and the tubing to be assembled and inspected by the system. The primary feature of the table 12 is its horizontal planar table surface 18. The table surface 18 in the illustrative embodiment of the invention is rectangular. The area of the table surface 18 is defined by the four edges 22, 24, 26, 28 of the table surface. One of the table surface edges 22 defines an X coordinate axis and a second edge of the table surface 24 defines a Y coordinate axis. The lengths of the X axis edge 22 and the Y axis edge 24 are mutually perpendicular. A multiple of X coordinate locations are spatially assigned along the length of the X axis edge 22 and a multiple of Y coordinate locations are spatially assigned along the Y axis edge 24. The X axis coordinate locations and the Y axis coordinate locations define a two dimensional grid or array of X and Y coordinate locations on the table surface 18. Each of the X and Y coordinate locations also has a Z axis 32 that is perpendicular to the table surface 18. The X and Y coordinate locations on the table surface 18 are used by the control system 16 to control movements of the robotic fixtures 14 on the table surface, as will be explained.

Figure 2:
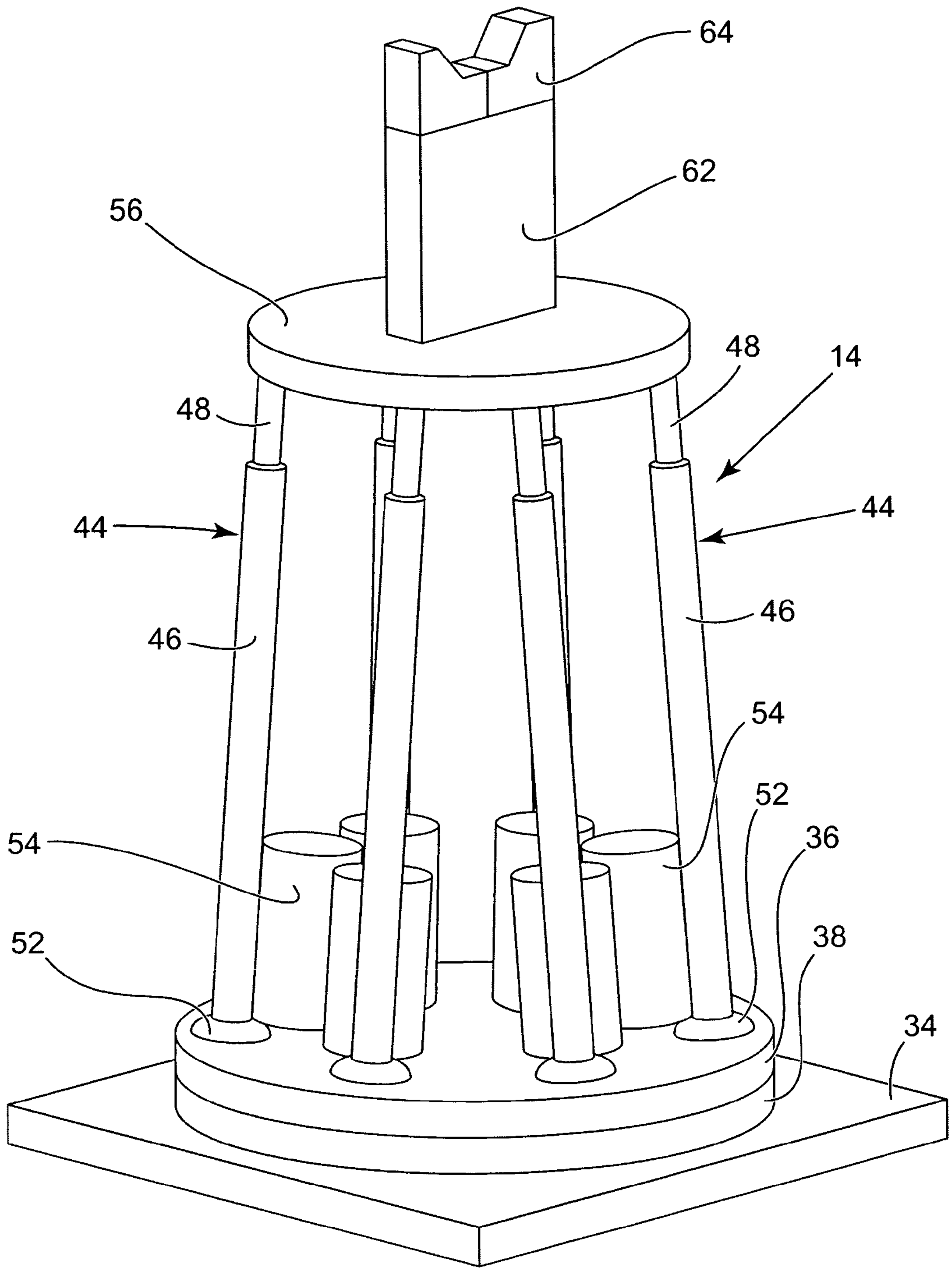
FIG. 2 is an enlarged schematic representation of a robotic fixture of the system.

Each of the small-scale robotic fixtures 14 employed on the table surface 18 have the same constructions. An enlarged view of one of the robotic fixtures 14 is shown in FIG. 2. Each of the robotic fixtures 14 is supported on a base 34 that contains a motive source of the fixture. The motive source enables the fixture 14 to move along the X and Y axes defined by the X edge 22 and Y edge 24 of the table surface 18. In the preferred embodiment of the fixture 14, the motive source contained by the base 34 is a plurality of linear servomotors and a plurality of movement encoders that communicate with the motors to move the base 34 in the X and Y directions. In addition, the motive source of the base 34 preferably connects to a source of air pressure that creates an air cushion between the bottom of the base 34 and the planar surface 18 of the table 12 to reduce friction between the base 34 and the table surface 18 and assist in the movements of the fixture 14. Preferably, a 15-micron air cushion is created between the bottom of the base 34 and the table surface 18 when the robotic fixture 14 is operated.

A two-piece turntable assembly 36, 38 is mounted on the top of the fixture base 34. The two pieces 36, 38 of the turntable assembly can be controlled to rotate relative to each other and provide a mechanism for rotating the upper part of robotic fixture 14 about the Z axis 32.

A plurality of linear actuators 44 are mounted on the top piece 36 of the two piece turntable. Each linear actuator 44 is comprised of a lower member 46 that is mounted on the turntable top piece 36, and an upper member 48 that projects upwardly from the actuator lower member 46. The actuator lower member 46 is mounted to the top piece of the turntable 36 by a ball and socket joint 52. The actuator upper member 48 is mounted to the lower member 46 for linear reciprocating movement of the upper member relative to the lower member. The actuators 44 could be hydraulically or pneumatically controlled, or could be screw thread actuators or other equivalent types of mechanisms that cause the reciprocating movement of the actuator upper member 48 relative to the actuator lower member 46. The movement of the actuator upper member 48 is effected by a motive source 54 (for example, a valve housing for controlling hydraulic or pneumatic fluids supplied to the actuator or an electric motor that drives a screw threaded actuator). The robotic fixture 14 shown in FIG. 2 has six actuators. However, this number could change depending on the application of the system.

The actuator upper members 48 are connected to the underside of a tubing support 56 by a ball and socket joint (not shown, but similar to 52). By adjusting the lengths of all of the actuators 44 together, the tubing support 56 can be moved upwardly and downwardly relative to the table surface 18. In addition, adjusting the lengths of the actuators 44 can pivot the tubing support 56 to a variety of different angles relative to the table surface 18, enabling pitch and roll adjustments of the tubing support 56.

An end effector or tubing holder 62 is mounted on each of the tubing supports 56. The tubing holders 62 are mounted on the tubing supports 56 for movement of the tubing holders 62 on the tubing supports 56 by relative rotation of the two pieces of the turntable assembly 36, 38 and by movement of the actuators 44. Each tubing holder 62 is also provided with a tubing clamp 64 that can be controlled to widen or narrow to interface with and support tubing parts of various different diameters.

Figure 3:
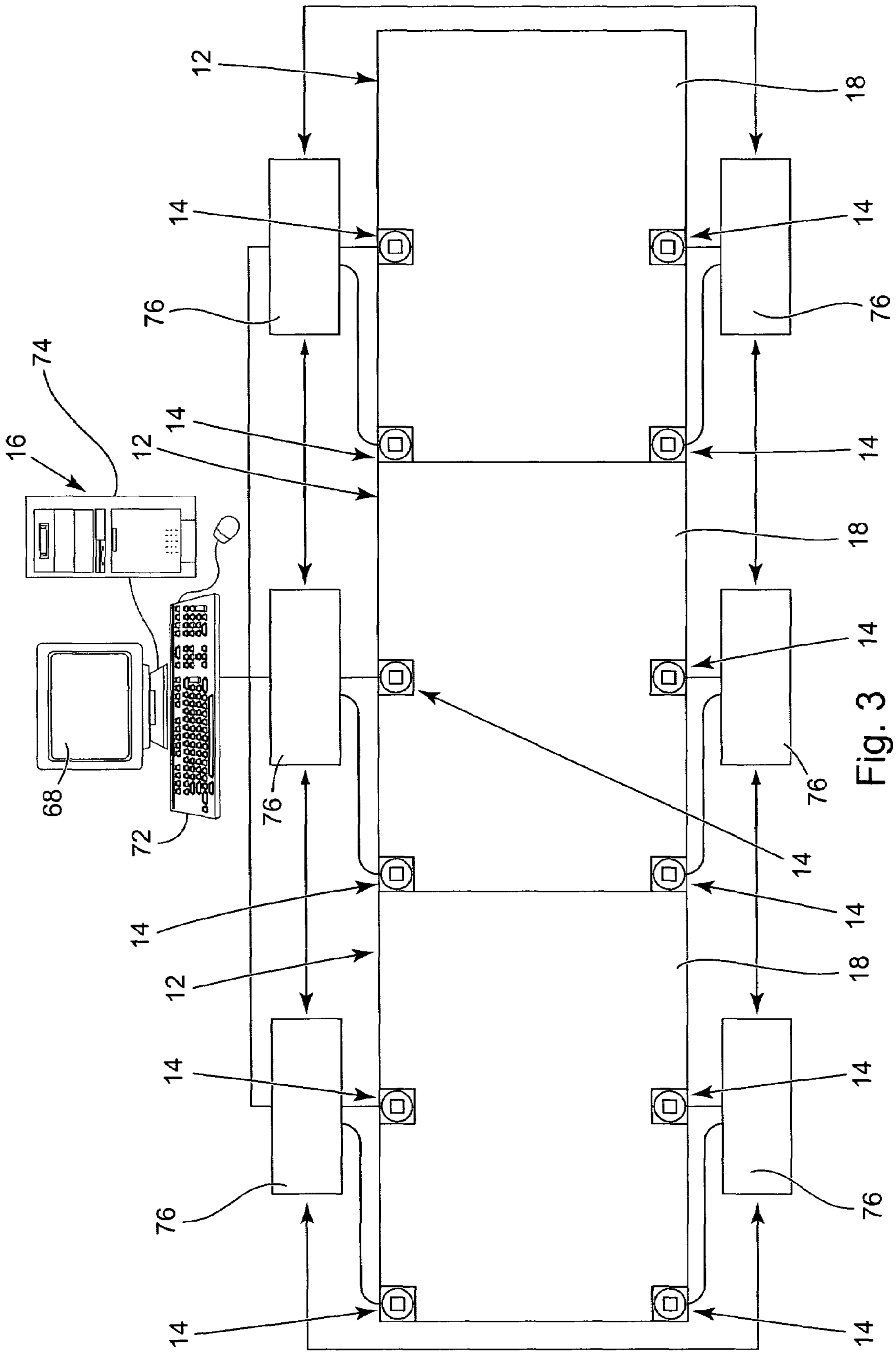
FIG. 3 is a schematic plan view of the system.

FIG. 3 shows the tubing assembly and inspection system of the invention in which three modular tables 12 are interconnected. Each of the tables 12 supports four robotic fixtures on the table surface 18. FIG. 3 shows only one example of the modular system of the invention. The system could employ only one table 12 supporting a multiple of fixtures 14, or could employ more than the three tables shown in FIG. 3. In addition, a greater or lesser number of robotic fixtures 14 could be assigned to each table 12.

The computerized control system 16 is communicated with each of the tables 12 and each of the robotic fixtures 14. The example of the control system 16 shown in FIG. 3 comprises a display 68, an input keyboard 72, and a database 74 that stores data on all of the tubing configurations to be assembled and inspected by the system. The control system 16 communicates with a plurality of servo and air controllers and amplifiers 76. The servo and air controllers and amplifiers 76 communicate with each of the tables 12 and the robotic fixtures 14 assigned to the tables. FIG. 3 shows the relative positions of the tables 12 and robotic fixtures 14 in one example of the initial set up of the tubing assembly and inspection system of the invention.

The control system database 74 stores data on all of the tubing configurations to be assembled and inspected. In use, an operator inputs part number information into the control system 16 using the keyboard 72 or a bar code reader (not shown). The operator then initiates the operation of the system.

Figure 4:
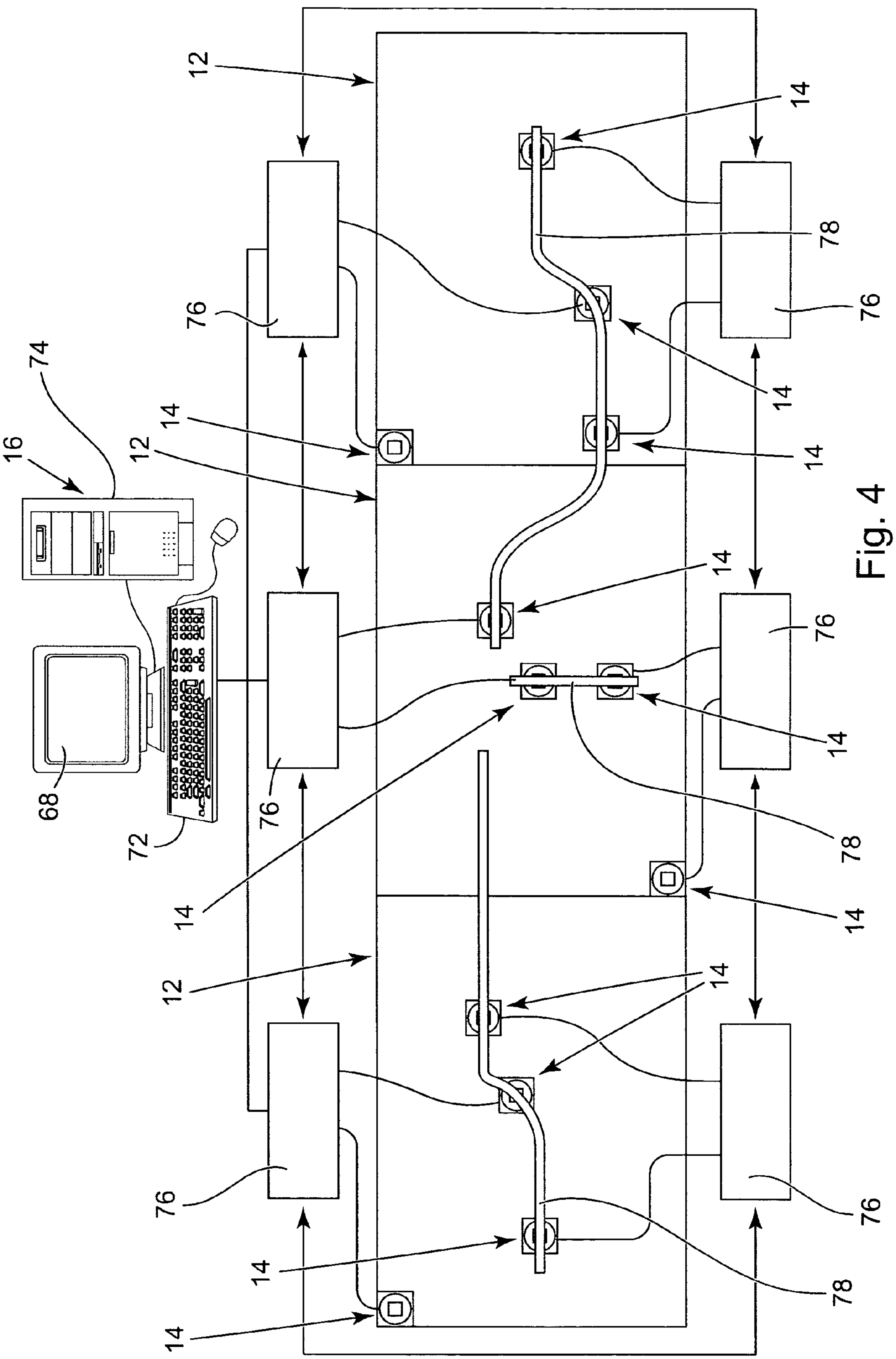
FIG. 4 is a schematic plan view of the system.

The robotic fixtures 14 are controlled by the control system 16 to then simultaneously position themselves at predetermined X and Y coordinate locations on the table surfaces 18. The tube holders 62 of each fixture are also rotated about their Z axes to predetermined positions. FIG. 4 shows an example of the robotic fixtures 14 of each table surface 18 after the fixtures have moved to their predetermined positions. The actuators 44 beneath the tubing supports 56 and the tubing holders 62 are operated so that the tubing holders are moved to programmed positions to accept lengths of tubing 78 to be inspected and assembled.

The system operator then positions the length of tubing to be assembled and inspected on the tubing holders 62 of the robotic fixtures 14. As shown in FIG. 4, not all of the robotic fixtures 14 on each table surface may be used in particular applications of the system. With the lengths of tubing 78 supported on the tubing holders 62 as shown in FIG. 4, the system operator then verifies the position and fit of the tubing, and the coordinates of all of the robotic fixtures 14 are then printed out as a mean of inspection. In case of non-conformance, individual robotic fixture 14 may be manipulated to fit the tubing 78 and the deviation may be recorded or printed.

Figure 5:
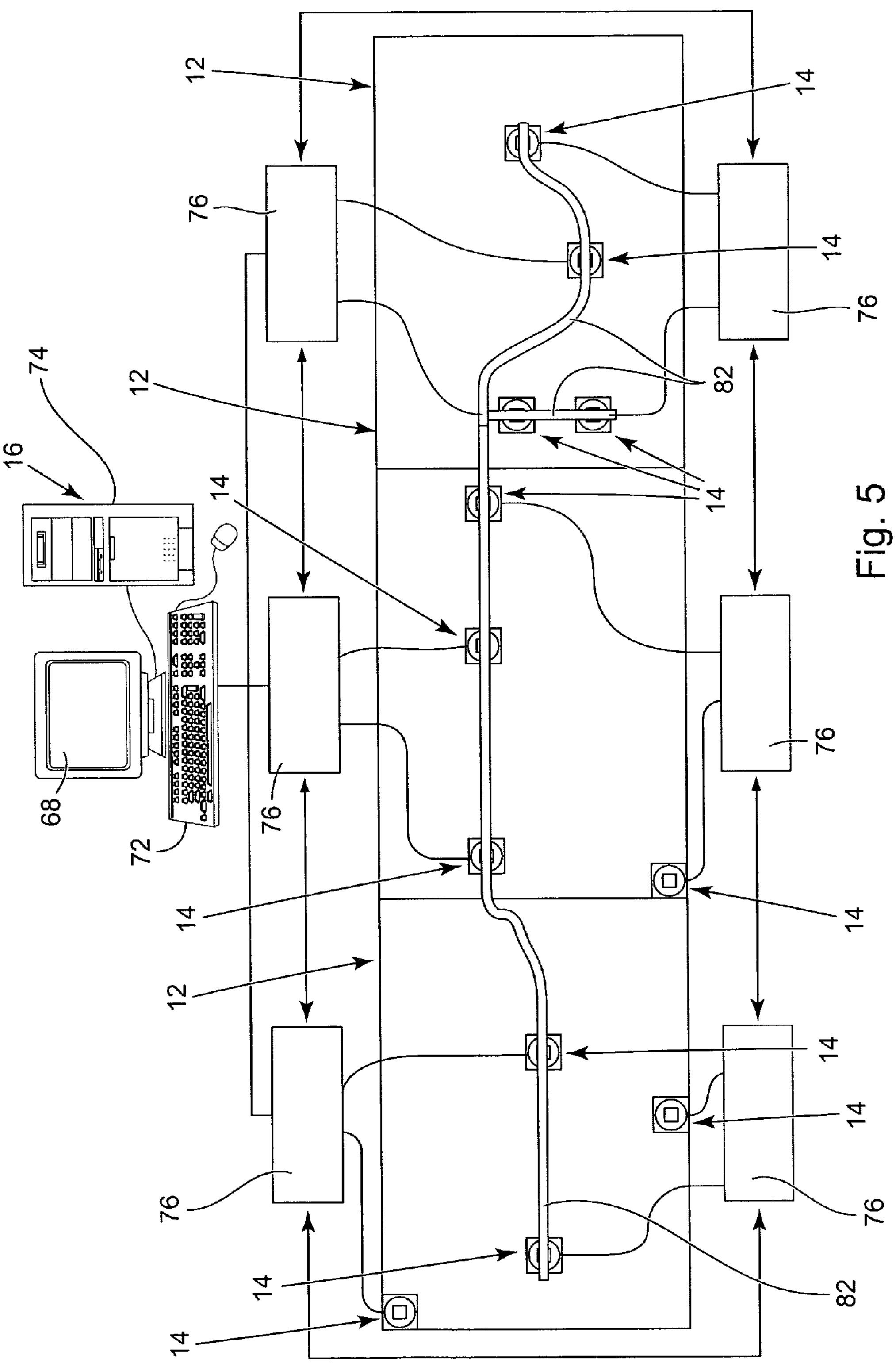
FIG. 5 is a schematic plan view of the system.

FIG. 5 is a view similar to that of FIG. 4, but showing the robotic fixtures 14 positioned on their table surfaces 18 for both inspection and assembly of several lengths of tubing 82. The benefit of the system being modular is shown in FIG. 5. The multiple tables 12, each with a multiple of robotic fixtures 14, are interconnected to inspect and assemble larger lengths of tubing 82.

Compared with all other existing tubing assembly and inspection methods, the automated assembly and inspection system of the invention is preferred in that it completely automates the assembly and inspection process. It eliminates operator errors and can provide potential tubing bend error feedback to tubing bending machines. It eliminates the current time-consuming manual fixture retrieval, adjustment, drawing retrieval and all logistical problems involved. In addition, the system of the invention also applies to tubing assembly and inspection operations of various different industries.

Although the system of the invention has been described by reference to a preferred embodiment, it should be understood that variations and modifications could be made to the system without departing from the scope of protection defined by the following claims.

The invention claimed is:

1. A tubing assembly and inspection apparatus comprising:

a table having a planar table surface with a surface area that is defined by mutually perpendicular X axis and Y axis directions;

a plurality of tubing support fixtures mounted on the table surface, each support fixture being adapted to support a length of tubing, each support fixture having a separate motive source supporting the support fixture on the table surface for movement of the support fixture over the table surface in both the X axis direction and the Y axis direction; and a control system communicating with each of the support fixtures for controlling movement of the support fixtures over the table surface to predetermined locations of the support fixtures on the table surface.

2. A tubing assembly and inspection apparatus comprising:

a table having a planar table surface;

a plurality of tubing support fixtures mounted on the table surface, each support fixture being adapted to support a length of tubing, each support fixture having a motive source supporting the support fixture on the table surface for movement of the support fixture over the table surface;

a control system communicating with each of the support fixtures for controlling movement of the support fixtures over the table surface to predetermined locations of the support fixtures on the table surface; and the motive source of each support fixture supporting the support fixture for movement on the table surface in mutually perpendicular directions over the table surface.

3. The apparatus of claim 2, further comprising:

each support fixture having a tubing holder that is rotatable relative to the table surface.

4. The apparatus of claim 3, further comprising:

the tubing holder being operable to selectively grip and release a length of tubing positioned on the tubing holder.

5. A tubing assembly and inspection apparatus comprising:

a table having a planar table surface;

a plurality of tubing support fixtures mounted on the table surface, each support fixture being adapted to support a length of tubing, each support fixture having a motive source supporting the support fixture on the table surface for movement of the support fixture over the table surface;

a control system communicating with each of the support fixtures for controlling movement of the support fixtures over the table surface to predetermined locations of the support fixtures on the table surface;

the motive source of each support fixture supporting the support fixture for movement on the table surface in mutually perpendicular directions over the table surface;

each support fixture having a tubing holder that is rotatable relative to the table surface; and each support fixture having an actuator operatively connected to the tubing holder for moving the tubing holder relative to the support fixture.

6. The apparatus of claim 5, further compromising:

the at least one actuator being operatively connected to the tubing holder to pivot the tubing holder about two, mutually perpendicular axes.

7. The apparatus of claim 5, further comprising:

the at least one actuator being operatively connected to the tubing holder to move the tubing holder upwardly and downwardly relative to the table surface.

8. A tubing assembly and inspection apparatus comprising:

a table having a planar table surface;

a plurality of tubing support fixtures mounted on the table surface, each support fixture being adapted to support a length of tubing, each support fixture having a motive source supporting the support fixture on the table surface for movement of the support fixture over the table surface;

a control system communicating with each of the support fixtures for controlling movement of the support fixtures over the table surface to predetermined locations of the support fixtures on the table surface;

the table surface having an area that is defined by mutually perpendicular X and Y axes of the table surface, the X axis having X coordinate locations spacially arranged along the X axis and the Y axis having Y coordinate locations spacially arranged along the Y axis, the X coordinate locations and the Y coordinate locations defining a grid of X and Y coordinate locations on the table surface; and the grid of X and Y coordinate locations being recorded in the control system whereby the control system controls movement of the support fixtures over the table surface to predetermined X and Y coordinate locations on the table surface.

9. The apparatus of claim 8, further comprising:

the planar table surface defining a Z axis of each support fixture that is perpendicular to the table surface and to the X and Y axes; and the control system controlling movement of each support fixture on the table surface for rotation of the support fixture about the Z axis.

10. A tubing assembly and inspection apparatus comprising:

a plurality of separate tables, each table having a planar table surface with a surface area that is defined by mutually perpendicular X axis and Y axis directions;

at least one tubing support fixture mounted on each table surface, each support fixture being adapted to support a length of tubing, and each support fixture having a separate motive source supporting the support fixture on the table surface for movement of the support fixture over the table surface in both the X axis direction and the Y axis direction.

11. The apparatus of claim 10, further comprising:

the plurality of tables being removably interconnected.

12. The apparatus of claim 10, further comprising:

a control system communicating with each of the support fixtures on each of the table surfaces for controlling movements of the support fixtures over the table surfaces.

13. The apparatus of claim 10, further comprising:

a plurality of support fixtures mounted on each table surface.

14. The apparatus of claim 10, further comprising:

the motive source of each support fixture on each table surface supporting the support fixture for movement on the table surface in mutually perpendicular directions over the table surface.

15. The apparatus of claim 10, further comprising:

each support fixture on each table surface having a tubing holder that is rotatable relative to the table surface.

16. The apparatus of claim 10, further comprising:

each support fixture on each table surface having a tubing holder that is operable to selectively grip and release a length of tubing positioned on the tubing holder.

17. A tubing assembly and inspection apparatus comprising:

a plurality of separate tables, each table having a planar table surface;

at least one tubing support fixture mounted on each table surface, each support fixture being adapted to support a length of tubing, and each support fixture having a motive source supporting the support fixture on the table surface for movement of the support fixture over the table surface;

each support fixture on each table surface having a tubing holder that is rotatable relative to the table surface; and each support fixture on each table surface having an actuator operatively connected to the tubing holder for movement of the tubing holder relative to the table surface.

18. The apparatus of claim 17, further comprising:

the actuator being operable to pivot the tubing holder about two mutually perpendicular axes.

19. The apparatus of claim 17, further comprising:

the actuator being operable to move the tubing holder upwardly and downwardly relative to the table surface.

20. A method of assembling and inspecting tubing, the method comprising:

providing a table with a planar table surface having a surface area that is defined by mutually perpendicular X axis and Y axis directions;

providing a plurality of tubing support fixtures on the table surface with each support fixture being adapted to support a length of tubing and each support fixture having a separate motive source that is operable to move the support fixture over the table surface in both the X axis direction and the Y axis direction;

operating the motive source of each support fixture to move each support fixture to a predetermined location on the table surface; and positioning a length of tubing on each support fixture.

21. The method of claim 20, further comprising:

providing a control system and communicating the control system with each of the support fixtures; and, controlling movements of the support fixtures on the table surface by the control system.

22. The method of claim 21, further comprising:

providing a tubing holder on each support fixture and moving the tubing holder relative to the table surface by the control system.

23. The method of claim 21, further comprising:

defining an area of the table surface with mutually perpendicular X and Y axes of the table surface;

spacially assigning X coordinate locations along the X axis and spacially assigning Y coordinate locations along the Y axis;

defining a grid of X and Y coordinate locations on the table surface; and, using the grid of X and Y coordinate locations in the control system to control movements of the support fixtures over the table surface to predetermined X and Y coordinate locations on the table surface.

24. The method of claim 23, further comprising:

using the control system to control rotation of the support fixtures on the table surface around a Z axis of each support fixture that is perpendicular to the X and Y axes.

25. A method of assembling and inspecting tubing, the method comprising:

providing a table with a planar table surface;

providing a plurality of tubing support fixtures on the table surface with each support fixture being adapted to support a length of tubing and each support fixture having a motive source that is operable to move the support fixture over the table surface;

operating the motive source of each support fixture to move each support fixture to a predetermined location on the table surface;

positioning a length of tubing on each support fixture; and securing together lengths of tubing positioned on the support fixtures.

* * * * *